(12) United States Patent
Sandmel et al.

(10) Patent No.: US 9,013,512 B2
(45) Date of Patent: Apr. 21, 2015

(54) OVERSCAN SUPPORT

(75) Inventors: Jeremy Sandmel, Cupertino, CA (US); Joshua H. Shaffer, San Jose, CA (US); Toby C. Paterson, Cupertino, CA (US); Patrick Coffman, San Francisco, CA (US); Geoffrey Stahl, Cupertino, CA (US); John S. Harper, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 447 days.

(21) Appl. No.: 13/368,464

(22) Filed: Feb. 8, 2012

(65) Prior Publication Data

US 2013/0201197 A1    Aug. 8, 2013

(51) Int. Cl.
| | | |
|---|---|---|
| G09G 5/391 | (2006.01) | |
| G06T 3/40 | (2006.01) | |
| H04N 5/46 | (2006.01) | |
| G09G 5/14 | (2006.01) | |
| H04N 5/44 | (2011.01) | |
| H04N 7/01 | (2006.01) | |
| H04N 9/64 | (2006.01) | |
| H04N 21/462 | (2011.01) | |
| G06F 3/14 | (2006.01) | |
| H04N 21/482 | (2011.01) | |

(52) U.S. Cl.
CPC *G09G 5/391* (2013.01); *G06T 3/40* (2013.01); *H04N 9/642* (2013.01); *H04N 5/46* (2013.01); *G09G 5/14* (2013.01); *H04N 5/4401* (2013.01); *H04N 21/4622* (2013.01); *H04N 7/0122* (2013.01); *G06T 3/4076* (2013.01); *G06F 3/1431* (2013.01); *H04N 21/482* (2013.01)

(58) Field of Classification Search
CPC ..... G09G 5/14; G09G 5/391; G09G 2340/04; G06T 2219/2016; G06T 3/4076; G06T 3/40; H04N 5/4401; H04N 5/46; H04N 7/0122; H04N 9/642; G06F 3/1431
See application file for complete search history.

(56) References Cited

U.S. PATENT DOCUMENTS

| | | | |
|---|---|---|---|
| 7,675,574 B2 * | 3/2010 | Ishii et al. | ...... 348/558 |
| 2005/0266923 A1 | 12/2005 | Ishii | |
| 2007/0296727 A1 | 12/2007 | Kumakawa | |
| 2011/0234910 A1 | 9/2011 | Takayama | |

OTHER PUBLICATIONS

International Search Report and Written Opinion received in corresponding PCT Application No. PCT/US2013/023993, dated Apr. 23, 2013.

* cited by examiner

*Primary Examiner* — Mark Zimmerman
*Assistant Examiner* — Sarah Le
(74) *Attorney, Agent, or Firm* — Wong, Cabello, Lutsch, Rutherford & Brucculeri, LLP

(57) ABSTRACT

Systems, methods, and computer readable media for dynamically setting an executing application's display buffer size are described. To ameliorate display device overscan operations, the size of an executing application's display buffer may be set based on the display device's extent and a display mode. In addition, contents of the executing application's display buffer may be operated on as they are moved to a frame buffer based on the display mode. In one mode, for example, display buffer contents may be scaled before being placed into the frame buffer. In another mode, a black border may be placed around display buffer contents as it is placed into the frame buffer. In yet another mode, display buffer contents may be copied into the frame buffer without further processing.

12 Claims, 6 Drawing Sheets

OVERSCAN SUPPORT

BACKGROUND

This disclosure relates generally to the field of display technology. More particularly, this disclosure relates to a technique for setting an executing application's display buffer size based, at least in part, on the type of information that application indicates it will display.

Early televisions were highly variable in how the video image was framed within the television's cathode ray tube (CRT). Because of this, manufactures defined three areas: (1) title safe, an area assumed to be visible on all display devices and, as such, where text was certain not to be cut off; (2) action safe, an area that represents the visible area for a "perfect" display device; and (3) overscan, the full image area. Thus, the term "overscan" refers to an area around the four edges of a video image that may not be reliably seen by a viewer.

While early display devices performed overscan to compensate for manufacturing issues, modern pixelated display devices such as liquid crystal displays (LCDs) do not need to do this. Many, however, do so. This, and the fact that applications do not know whether the display device coupled to the system on which they are executing perform overscanning, can result in a sub-optimal display. For example, if an application assumes the display device overscans it may pre-compensate for this by scaling its output to a size smaller than the display device's actual extent. If the display device does overscan, it will display the application's output with a black border. If the display does not overscan, however, the application produces an output with an unnecessary black border. On the other hand, if the application does not assume that the display device overscans it may generate an output matching the display device's full extent. If the display device does not overscan, the application will use it's full extent. Now, however, if the display device does overscan some of the application's output will be clipped. Thus, it would be beneficial to provide a mechanism to dynamically set the display region used by an application based, at least in part, on the application's type of output.

SUMMARY

Techniques described herein provide methods to set an executing application's display buffer size based on a display device's extent and a display mode. A display method in accordance with a first embodiment includes determining one or more characteristics of a display device. Illustrative characteristics include the display device's display extent and whether the device overscans its input. An executing application may then indicate its desired display mode. In a first illustrative display mode the application does not compensate for overscanning; expecting the supporting environment to take care of these chores. In a second illustrative mode the application pre-compensates for the expected overscanning. In a third illustrative mode, the application provides content that may be cropped by overscanning without affecting the application's performance and content that should not be cropped. In this latter case the application may place the second type of content in a "display safe" region of its display buffer. Once the application has specified its desired display mode, one or more display buffer characteristics may be sent to the executing application based at least in part on the display mode and at least one of the display device characteristics. The application may use these characteristics to define the size of its display buffer. For example, in one mode the application may be told to set its display buffer to a size that is less (i.e., smaller) than a frame buffer used to drive the display device. In this mode, the application can pre-compensate its display output by writing only to the smaller display buffer. In another mode the application may be given two size values; the first representing the display device's full extent and a small value indicating a region within the display buffer that is "display safe." Methods in accordance with this disclosure may be embodied in program code and placed in non-transitory storage or embodied in hardware devices (e.g., computer systems and/or mobile devices) that, using a program control device (e.g., a computer processor), may implement the described methods.

DETAILED DESCRIPTION

This disclosure pertains to systems, methods, and computer readable media for dynamically setting an executing application's display buffer size. In general, an application may address the overscan display issue in one of three ways: (1) ignore it; (2) pre-compensate by limiting the area in a display buffer that it uses to store information it wants displayed; and (3) use a display device's full extent while restricting the location of information it does not want "clipped" to a region in its display buffer that may be reliably viewed. To improve display performance, the size of an application's display buffer, and the tasks performed when moving the contents of that display buffer to a frame buffer, may be based not only on the extent of the target display device, but on how the application intends to address the overscan issue (i.e., the type of information to be displayed). More particularly, once a display device's characteristics are determined (e.g., its extent), the executing application may be told to set its display buffer size to different values based on the manner in which it indicates it wants to address the overscan issue.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of image capture devices having the benefit of this disclosure.

Figure 1:
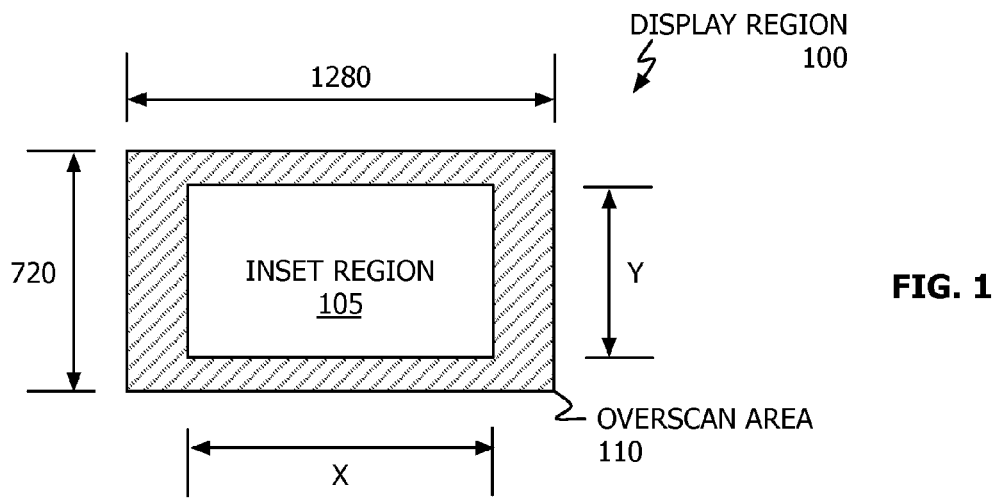
FIG. 1 illustrates a display region having an inset region and an overscan area in accordance with one embodiment.

In the following, various embodiments will be described in which an executing application approaches the overscan issue in one of the three ways identified above: (1) ignore it; (2) pre-compensate; or (3) use the display device's full extent. For convenience these approaches will be assigned modes: mode 1 for approach 1; mode 2 for approach 2; and mode 3 for approach 3. In addition, a display device extent corresponding to the 720p standard will be used for illustrative purposes throughout this disclosure. Referring to FIG. 1, display region 100 in accordance with the 720p standard has an extent measuring 1,280 pixels by 720 pixels; inset region 105 may have 'X' pixels in the horizontal direction and 'Y' pixels in the vertical direction, such a region defining overscan area 110. It will be recognized that the particular values assigned to 'X' and 'Y' may vary based on the specific type of display device (i.e., the size of its overscan area). One of ordinary skill in the art will understand that the invention is not so limited to these embodiments. Other numbers of modes and/or other display extents may be easily accommodated.

Figure 2:
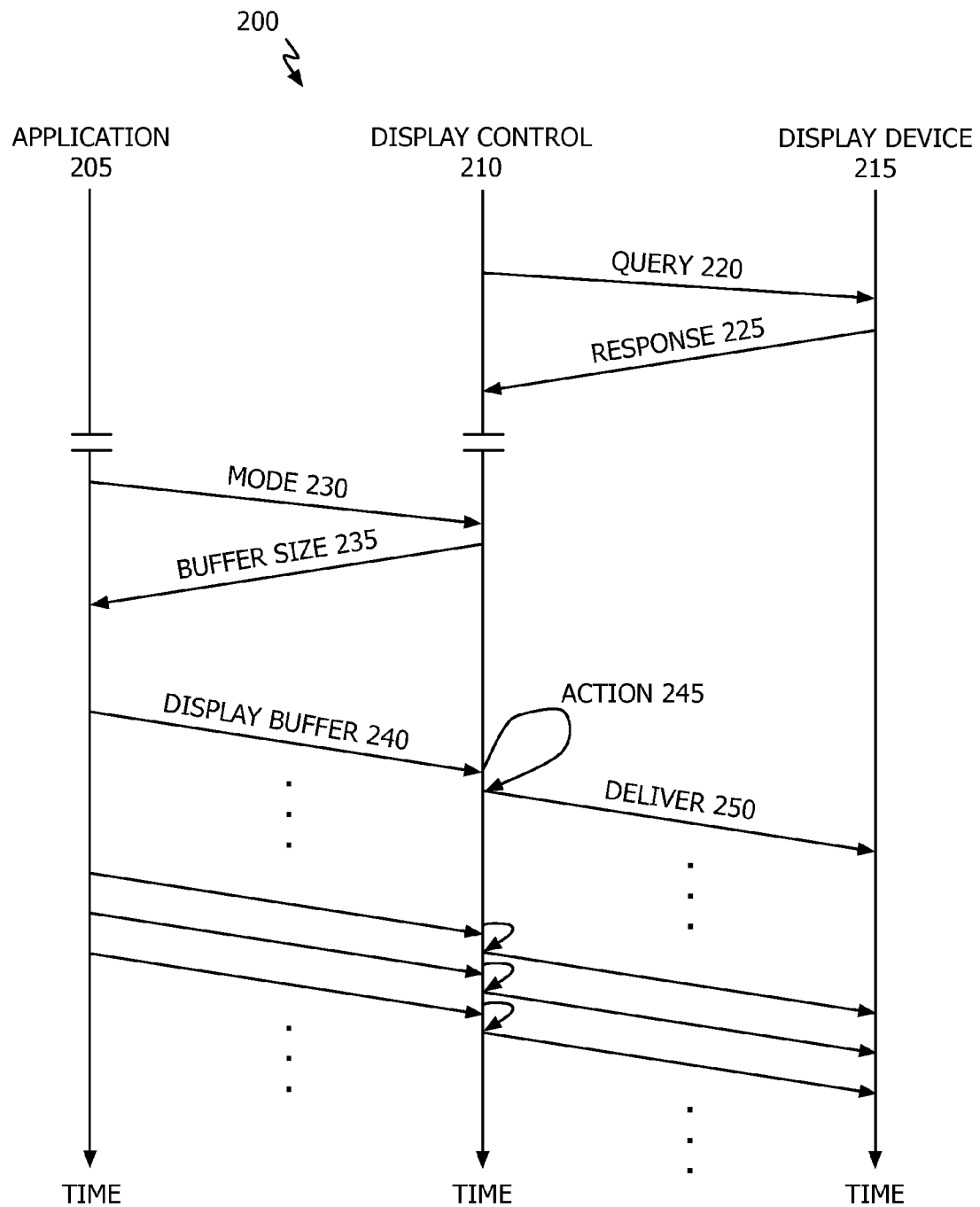
FIG. 2 shows an operational timeline for a display operation in accordance with one embodiment.

Referring to FIG. 2, operational timeline 200 for a display operation in accordance with this disclosure shows the communication between executing application 205, display control 210, and display device 215. As used herein, the phrase "display control" may refer to one or more software modules and/or select hardware of an operational environment within which application 205 executes. Initially display control 210 queries display device 215 (220) to obtain its display characteristics (225). In another embodiment, display device 215 may affirmatively "push" its display characteristics to display control 210. At some later time, application 205 informs display control 210 of its display mode (230). In response, display control 210 may tell application 205 the size it should make its display buffer (235).

Referring to Table 1, in the embodiment being described here, when application 205 indicates that it is operating in display mode 1, display control 210 may tell application 205 to make its display buffer 1280×720. When application 205 indicates that it is operating in display mode 2, display control 210 may tell application 205 to make its display buffer 1216× 684. And when application 205 indicates that it is operating in display mode 3, display control 210 may tell application 205 to make its display buffer 1280×720. The reduced display buffer size identified in Table 1 (1216×684)—corresponding to inset region 105—is merely illustrative, the exact dimensions being dependent upon the display device itself and/or on any rue the designer desires to implement for overscan compensation (e.g., a flat 5% along both horizontal and vertical directions).

TABLE 1

Illustrative Display Buffer Sizes When The Display Device Performs Overscan (Based on a 720 p Display)

| Mode | Appln's Display Buffer | Display Control Action |
|------|------------------------|------------------------|
| I | 1280 × 720 | Scale down, add black border and place into frame buffer |
| II | 1216 × 684 | Center in frame buffer with black border |
| III | (1280 × 720) and (1216 × 684) | Pass through to frame buffer |

When application 205 begins sending display buffers to display control 210 for display on device 215 (240), and it has been determined that display device 215 overscans, display control 210 may perform the action (245) designated in Table 1 as it passes the display buffer's contents to display device 215 (250).

Figure 3A:
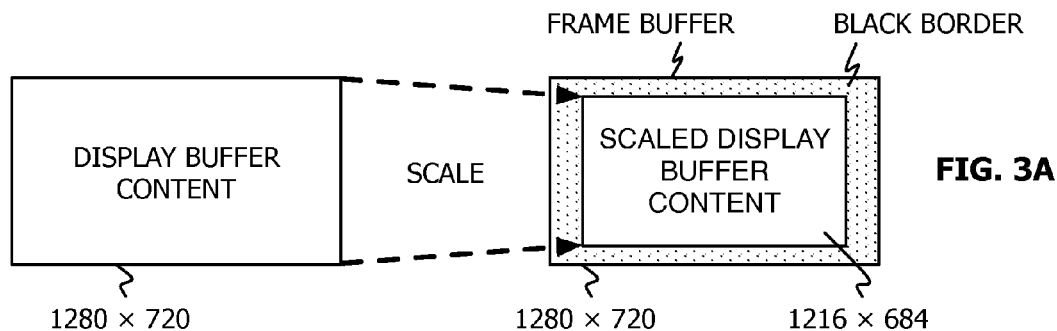
FIG. 3 shows, in block diagram form, actions performed on an application's display buffer content based on the application's designated display mode in accordance with one embodiment.
Figure 3B:
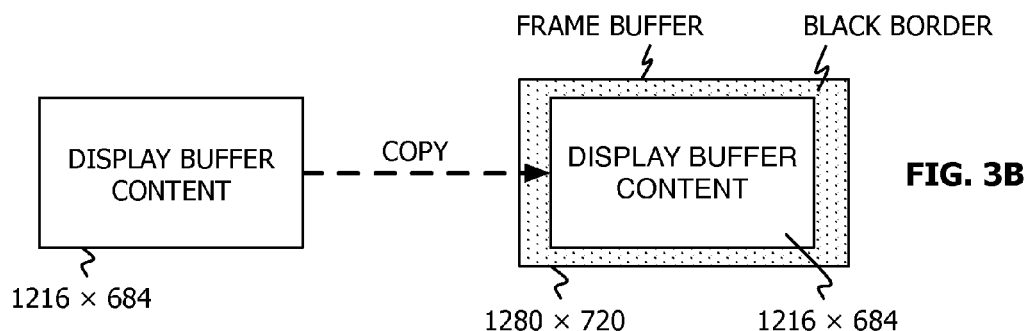
Figure 3C:
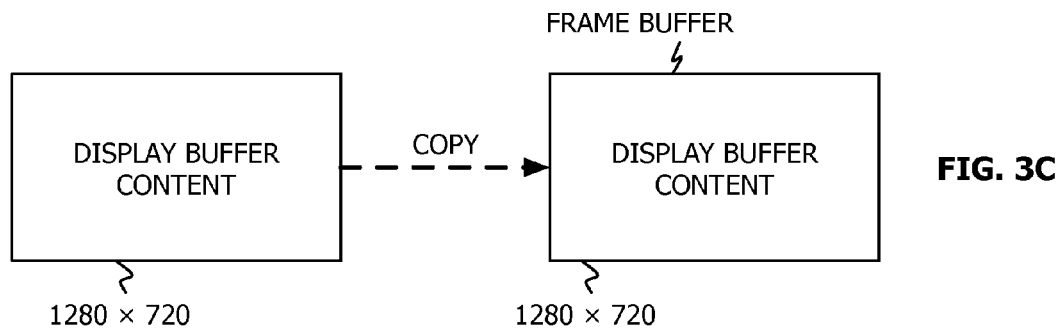

Referring to FIG. 3, the action indicated in Table 1 for each of the illustrative display modes is shown. In mode 1 (FIG. 3A), application 205 does nothing to address overscan operations by display device 215. As such, display control 210 may take the application's display buffer content and scale it to correspond to inset region 105. The scaled display buffer content is placed, and centered, into the display device's frame buffer with a black border. (It will be recognized that placing content into a frame buffer is tantamount to sending that content to a display device. Generally, the transfer of data from a frame buffer to a display device is handled by hardware.) In mode 2 (FIG. 3B), application 205 has pre-compensated for the overscan operation of display device 215. As such, display control 210 may simply copy the application's display buffer content into the center of the frame buffer and again provide a black border. In mode 3 (FIG. 3C), application 205 uses the display device's full extent, only this time the application itself has ensured content that should not be clipped is in a buffer region that will not get clipped during overscan operations of display device 215. As such, display control 210 may again simply copy the application's display buffer content into the frame buffer—this time, no black border need be provided.

Figure 4:
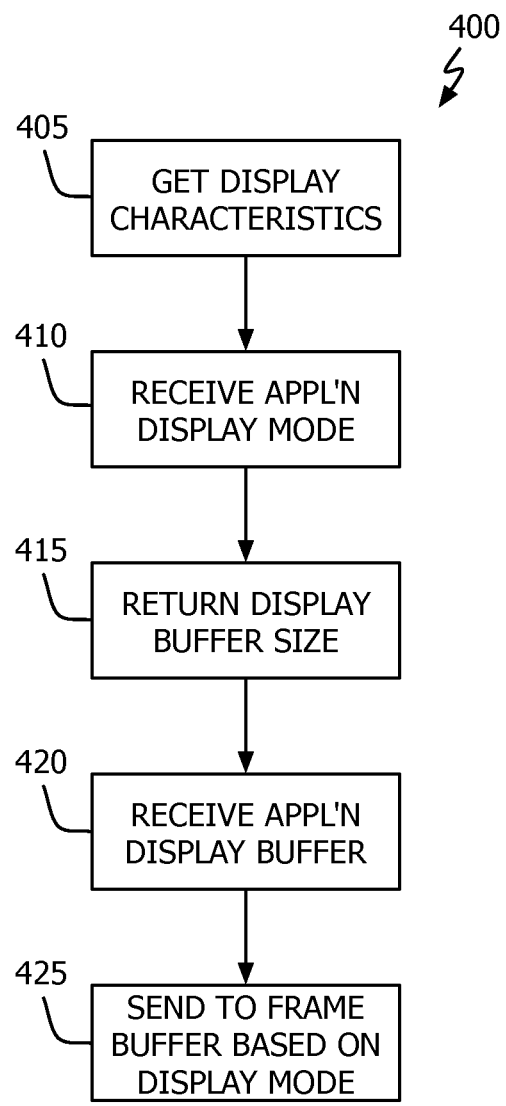
FIG. 4 shows, in flowchart form, a display operation in accordance with one embodiment.

Referring to FIG. 4, display operation 400 in accordance with this disclosure begins by obtaining a display device's display characteristics (block 405). Such information may be obtained directly from the display device itself, or it may be obtained from a data store (e.g., a database) that is either local or distal to display control 210 (e.g., accessed through a computer network such as the Internet). On being informed of the application's preferred display mode (block 410), the application is told how large to make its display buffer (block 415). In one embodiment, if an application does not indicate a preferred display mode, a default mode may be automatically selected (e.g., mode 1). As the application begins to send display buffer content (block 420), that content is manipulated and sent to a frame buffer based on the application's display mode (block 425).

Figure 5:
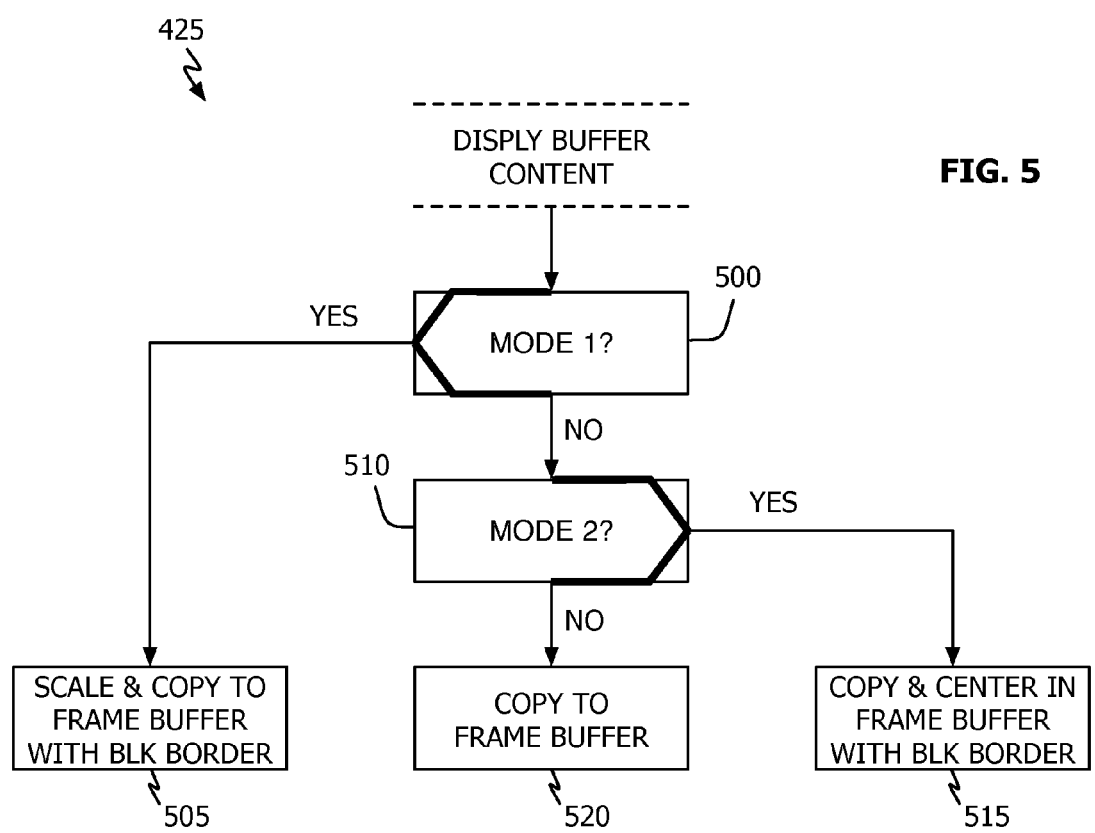
FIG. 5 shows, in flowchart form, a display mode determination method in accordance with one embodiment.

Acts in accordance with block 425, in which the possible display modes and operational characteristics are as shown in Table 1, are illustrated in FIG. 5. If display mode 1 has been selected (the "YES" prong of block 500), the application's display buffer content may be scaled to fit within the display device's inset region 105 (see FIG. 1) and centered in the frame buffer with a black border (block 505). If the display mode is not mode 1 (the "NO" prong of block 500), a check may be made to determine if display mode 2 has been selected. If it has (the "YES" prong of block 510), the application's display buffer content may be copied directly to the center of the frame buffer and a black border provided (block 515). If neither mode 1 or mode 2 has been selected (the "NO" prong of block 510), the application's display buffer may be copied directly to the frame buffer (block 520). While FIG. 2 shows, in flowchart form, what was discussed above vis-à-vis Table 1 and FIG. 3, the number of modes and specific actions is entirely up to the designer.

Figure 6:
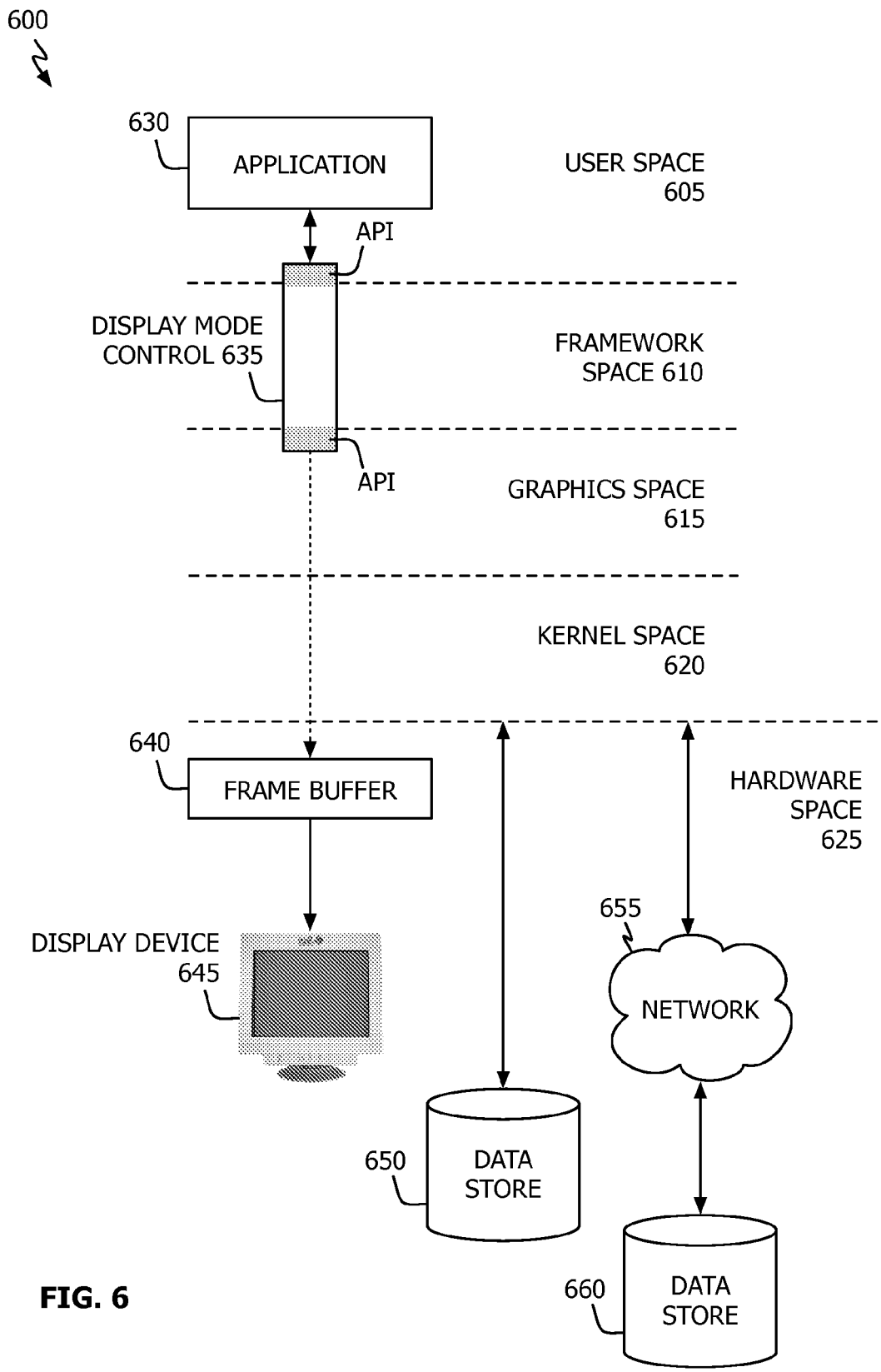
FIG. 6 shows, in block diagram form, an operational environment in accordance with one embodiment.

Referring to FIG. 6, illustrative operational environment 600 is seen to include user space 605, framework space 610, graphics space 615, kernel space 620, and hardware space 625. As shown, application 630 in user space 605 communicates with display mode control 635 through an application programming interface (API). In like fashion, display mode control 635 communicates with components in graphics space 615 via an API. Through standard interaction between graphics space 615, kernel space 620 and hardware space 625, display mode control 635 effectively/functionally communicates with frame buffer 640 and display device 645. Also shown in FIG. 6 are data store 650 and communication with computer network 655 and distal data store 660.

In one embodiment, operations in accordance with FIGS. 2, 3, and 4 may be performed by display mode control 635. Display mode control 635 could, for example, consist of one or more software modules that execute at the framework space level. By way of calls through an API to graphics space 615, display mode control 635 mediates the transfer of display buffer content from application 630 to frame buffer 640 (and hence, to display device 625). In another embodiment, the functionality of display mode control 635 (e.g., computer program code) may be distributed throughout or across different levels: framework space 610, graphics space 615, and kernel space 620.

It will be understood that user space 605, framework space 610, graphics space 615 and kernel space 620 are typically embodied in computer program code executing in memory, wherein the different spaces may represent different abstract levels of operation. It will be further understood that application 630 includes memory (within user space 605) designated as a display buffer. In addition, while display device 645 is shown as a standard computer display unit (e.g., part of a desktop computer system), this is not necessary. For example, display device 645 could be incorporated within a portable device such as a notebook or tablet computer as well as a hand-held unit such as a mobile telephone or personal music/video player.

Figure 7:
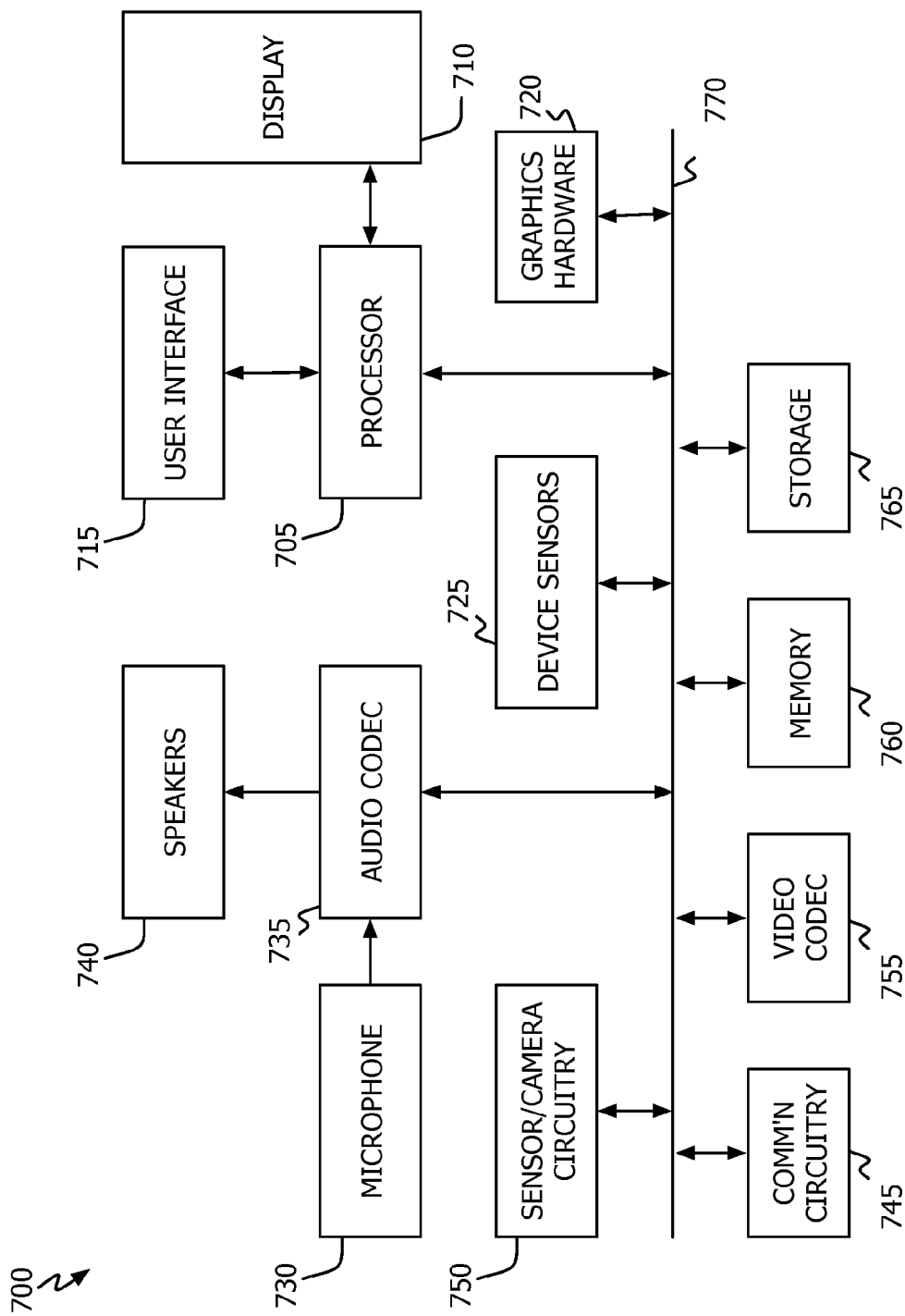
FIG. 7 shows, in block diagram form, an illustrative computer system that may be used to implement one or more operations in accordance with this disclosure.

Referring now to FIG. 7, a simplified functional block diagram of device 700 is shown according to one embodiment. As already noted, device 700 may represent a desktop, notebook or tablet computer system. Device 700 may also represent hand-held devices such as mobile telephones, personal digital assistants and personal music/video units. As illustrated, device 700 may include processor 705, display 710, user interface 715, graphics hardware 720, device sensors 725 (e.g., proximity sensor/ambient light sensor, accelerometer and/or gyroscope), microphone 730, one or more audio codecs 735, one or more speakers 740, communications circuitry 745, digital image capture unit 750, one or more video codecs 755, memory 760, one or more storage devices storage device 765, and communications bus 770.

Processor 705 may execute instructions necessary to carry out or control the operation of many functions performed by device 700 (e.g., such as operations in accordance with FIG. 4). Processor 705 may, for instance, drive display 710 and receive user input from user interface 715. User interface 715 may allow a user to interact with device 700 and can take a variety of forms such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 process graphics information. In one embodiment, graphics hardware 720 may include a programmable graphics processing unit (GPU).

Sensor and camera circuitry 750 may capture still and video images that may be processed, at least in part, by video codecs 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705 such computer program code may implement one or more of the methods described herein. It will also be understood that processor 705 may represent one or more processing units communicatively coupled.

Finally, it is to be understood that the above description is intended to be illustrative, and not restrictive. For example, the description above assumed the display device performed overscan. If this is not the case, display mode control 635 could simply pass the executing application's display buffer contents directly to frame buffer 640. In effect, this implements operations in accordance with mode 3 (application display buffer content is copied directly to the frame buffer). The above description indicates an execution application's display buffer content is moved (e.g., sent and received) as it is processed by display mode control 635 in accordance with FIGS. 2, 4, 5 and 6. In practice, may computer systems may simply manipulate pointers to reduce the amount of data that is physically manipulated. Such operations are to be considered part of the acts of moving, sending, etc. within the context of this disclosure. Finally, it should be understood that the above-described embodiments may be used in combination with each other. Many other embodiments will be apparent to those of skill in the art upon reviewing the above description. As such, the scope of the invention should therefore be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, comprising:
computer code to determine a display extent for a display device;
computer code to determine the display device overscans;
computer code to receive a value indicative of a display mode from an executing application;
computer code to send, to the executing application, a display buffer size value equal to the display extent when the display mode is a first mode;
computer code to send, to the executing application, a display buffer size value less than the display extent when the display mode is a second mode; and
computer code to send, to the executing application, first and second values when the display mode is a third mode, the first value equal to the display extent and the second value less than the display extent.

2. The non-transitory program storage device of claim 1, further comprising:
computer code to receive display buffer contents from the executing application;
computer code to scale the display buffer contents to a size less than the display extent when the display mode is the first mode;
computer code to cause the scaled display buffer contents to be centered in a frame buffer; and
computer code to cause a value indicative of a specified color to be written to the frame buffer at locations not occupied by the scaled display buffer contents.

3. The non-transitory program storage device of claim 1, further comprising:
computer code to receive display buffer contents from the executing application;
computer code to cause the display buffer contents to be centered in a frame buffer when the display mode is the second mode; and
computer code to cause a value indicative of a specified color to be written to the frame buffer at locations not occupied by the display buffer contents.

4. The non-transitory program storage device of claim 1, further comprising:
computer code to receive display buffer contents from the executing application; and
computer code to cause the display buffer contents to be written to a frame buffer when the display mode is the third mode.

5. A content display method, comprising:
determining a display extent for a display device;
determining the display device overscans;
receiving a value indicative of a display mode from an executing application;
sending, to the executing application, a display buffer size value equal to the display extent when the display mode is a first mode;
sending, to the executing application, a display buffer size value less than the display extent when the display mode is a second mode; and
sending, to the executing application, first and second values when the display mode is a third mode, the first value equal to the display extent and the second value less than the display extent.

6. The method of claim 5, further comprising:
receiving display buffer contents from the executing application;
scaling the display buffer contents to a size less than the display extent when the display mode is the first mode;
causing the scaled display buffer contents to be centered in a frame buffer; and
causing a value indicative of a specified color to be written to the frame buffer at locations not occupied by the scaled display buffer contents.

7. The method of claim 5, further comprising:
receiving display buffer contents from the executing application;
causing the display buffer contents to be centered in a frame buffer when the display mode is the second mode; and
causing a value indicative of a specified color to be written to the frame buffer at locations not occupied by the display buffer contents.

8. The method of claim 5, further comprising:
receiving display buffer contents from the executing application; and
causing the display buffer contents to be written to a frame buffer when the display mode is the third mode.

9. An electronic device, comprising:
a display;
a frame buffer memory adapted to communicatively couple to a display device;
a memory communicatively coupled to the frame buffer memory and having stored therein computer code; and
one or more processors communicatively coupled to the frame buffer memory and the memory, the one or more processors adapted to execute the computer code stored in the memory to:
determine a display extent for a display device,
determine the display device overscans,
receive a value indicative of a display mode from an executing application,
send, to the executing application, a display buffer size value equal to the display extent when the display mode is a first mode,
send, to the executing application, a display buffer size value less than the display extent when the display mode is a second mode, and
send, to the executing application, first and second values when the display mode is a third mode, the first value equal to the display extent and the second value less than the display extent.

10. The electronic device of claim 9, wherein the memory further stores computer code to cause the one or more processors to:
receive display buffer contents from the executing application;
scale the display buffer contents to a size less than the display extent when the display mode is the first mode;
cause the scaled display buffer contents to be centered in a frame buffer; and
cause a value indicative of a specified color to be written to the frame buffer at locations not occupied by the scaled display buffer contents.

11. The electronic device of claim 9, wherein the memory further stores computer code to cause the one or more processors to:
receive display buffer contents from the executing application;
cause the display buffer contents to be centered in a frame buffer when the display mode is the second mode; and
cause a value indicative of a specified color to be written to the frame buffer at locations not occupied by the display buffer contents.

12. The electronic device of claim 9, wherein the memory further stores computer code to cause the one or more processors to:
   receive display buffer contents from the executing application; and
   cause the display buffer contents to be written to a frame buffer when the display mode is the third mode.

\* \* \* \* \*